United States Patent
Tseng et al.

(10) Patent No.: US 7,835,091 B2
(45) Date of Patent: Nov. 16, 2010

(54) PROTECTIVE SHELL FOR AN ELECTRONIC DEVICE

(75) Inventors: Tien-Chung Tseng, Hsichih (TW); Hsin-Chuan Hsu, Hsichih (TW)

(73) Assignee: Wistron Corporation, Taipei Hsien (TW)

( * ) Notice: Subject to any disclaimer, the term of this patent is extended or adjusted under 35 U.S.C. 154(b) by 6 days.

(21) Appl. No.: 12/335,947

(22) Filed: Dec. 16, 2008

(65) Prior Publication Data

US 2009/0237812 A1  Sep. 24, 2009

(30) Foreign Application Priority Data

Mar. 24, 2008  (TW) .............................. 97110348 A

(51) Int. Cl.
 G02B 7/02 (2006.01)
 G02B 27/00 (2006.01)
 G02B 3/00 (2006.01)
(52) U.S. Cl. ................... 359/811; 359/813; 359/809
(58) Field of Classification Search ......... 359/801–803, 359/806, 808, 809, 811, 813
See application file for complete search history.

(56) References Cited

U.S. PATENT DOCUMENTS 5,576,897 A * 11/1996 Kuo ........................... 359/822
7,443,615 B2 * 10/2008 Chang ........................ 359/811

* cited by examiner

*Primary Examiner*—Alicia M Harrington
(74) *Attorney, Agent, or Firm*—Overhauser Law Offices, LLC

(57) ABSTRACT

A protective shell for an electronic device is adapted to accommodate the electronic device. The electronic device includes a camera lens. The protective shell includes a shell body and a lens device. The shell body is adapted to accommodate the electronic device. The lens device is mounted on the shell body, and includes a plurality of lenses. The lens device is operable to move relative to the shell body such that a selected one of the lenses correspondingly overlaps one side of the camera lens of the electronic device to permit switching among different modes of use, thereby enabling the camera lens to have different functions, such as close-up, filtering, wide-angle, and polarizing functions.

10 Claims, 7 Drawing Sheets

PROTECTIVE SHELL FOR AN ELECTRONIC DEVICE

CROSS-REFERENCE TO RELATED APPLICATION

This application claims priority of Taiwanese Application No. 097110348, filed on Mar. 24, 2008.

BACKGROUND OF THE INVENTION

1. Field of the Invention

The invention relates to a protective shell for an electronic device, more particularly to a protective shell having a lens device for an electronic device.

2. Description of the Related Art

Currently, lens modules of conventional cellular phones in general fall into two main types: a fixed focus lens module 11 of a cellular phone 1 shown in FIG. 1, and an adjustable focus lens module 21 of a cellular phone 2 as shown in FIG. 2. In use, if an object whose image is to be captured is too close to the cellular phone 1, since the focus of the lens module 11 is fixed, a close-up mode is not available, so that the image of the object captured by the lens module 11 may be fuzzy. With the ever-increasing demands of consumers for better functionality of cellular phones, although the lens module 21 of the cellular phone 2 may have a close-up function, mere close-up functions can no longer satisfy current consumer requirements. Therefore, to devise a simplified lens design that, in addition to providing a close-up function, enables the cellular phones 1, 2 to switch among various modes of use with different functions is the subject of improvement of this invention.

SUMMARY OF THE INVENTION

Therefore, an object of the present invention is to provide a protective shell for an electronic device, the protective shell including a lens device with lenses that cooperate with a camera lens of the electronic device to permit switching among different modes of use with various functions.

The object of the present invention and solutions to technical problems associated therewith are realized using the following technical means. The protective shell for an electronic device according to the present invention is adapted to accommodate the electronic device. The electronic device includes a camera lens. The protective shell includes a shell body and a lens device.

The shell body is adapted to accommodate the electronic device. The lens device is mounted on the shell body, and includes a plurality of lenses. The lens device is operable to move relative to the shell body such that a selected one of the lenses correspondingly overlaps one side of the camera lens of the electronic device.

The object of the present invention and the solutions to the technical problems associated therewith may be further realized using the following technical means.

In the aforesaid protective shell for an electronic device, the shell body includes an opening corresponding in position to the camera lens. The lens device includes a mount member coupled to the shell body, and a positioning mechanism. The lenses are disposed on the mount member and respectively have different functions. The positioning mechanism has a first positioning member disposed on one of the shell body and the mount member, and a plurality of second positioning members disposed on the other one of the shell body and the mount member. The first positioning member engages one of the second positioning members when the mount member is moved relative to the shell body to a position where a selected one of the lenses overlaps the opening and the camera lens.

In the aforesaid protective shell for an electronic device, the lenses are a convex lens, a filter lens, a wide-angle lens, and a polarized lens, respectively.

In the aforesaid protective shell for an electronic device, the shell body is formed from a flexible material, and includes an opening corresponding in position to the camera lens, and an inner peripheral wall defining the opening. The lens device includes a generally disc-shaped mount member. The lenses are disposed on the mount member and respectively have different functions. The mount member has a groove formed in an outer periphery thereof for engaging the inner peripheral wall.

In the aforesaid protective shell for an electronic device, the lens device further includes a coupling member disposed on the shell body, and the second positioning members are recesses disposed angularly on the coupling member. The mount member has a through hole for extension of the coupling member therethrough, and an inner peripheral surface defining the through hole. The first positioning member is a protrusion formed on the inner peripheral surface and engageable with the recesses.

In the aforesaid protective shell for an electronic device, the coupling member is integrally formed with the shell body and has a through hole. The lens device further includes a screw extending through the through hole in the coupling member, and a locking member abutting against the mount member and threadedly engaging the screw.

In the aforesaid protective shell for an electronic device, the shell body includes a hole portion, and the lens device further includes a screw extending through the hole portion. The coupling member abuts against the mount member and threadedly engages the screw.

In the aforesaid protective shell for an electronic device, the lens device further includes a coupling member disposed on the shell body. The first positioning member is a protrusion disposed on the coupling member. The mount member has a through hole for extension of the coupling member therethrough, and an inner peripheral surface defining the through hole. The second positioning members are recesses disposed angularly on the inner peripheral surface for engaging the protrusion.

In the aforesaid protective shell for an electronic device, the shell body includes a hole portion, and the lens device further includes a screw extending through the hole portion. The coupling member abuts against the mount member and threadedly engages the screw.

In the aforesaid protective shell for an electronic device, the lens device further includes two guide rails disposed on the shell body and spaced apart from each other. Each of the guide rails has a slide slot. The first positioning member is a protrusion projecting from the shell body and located between the two guide rails. The mount member is slidably connected to and is disposed between the slide slots of the guide rails. The second positioning members are retaining holes provided in the mount member at spaced intervals for engaging the protrusion.

In the protective shell for an electronic device according to the present invention, the mount member is rotatable or movable relative to the shell body such that a selected one of the lenses overlaps the camera lens to permit switching among different modes of use, thereby enabling the camera lens to have different functions, such as close-up, filtering, wide-angle and polarizing functions.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
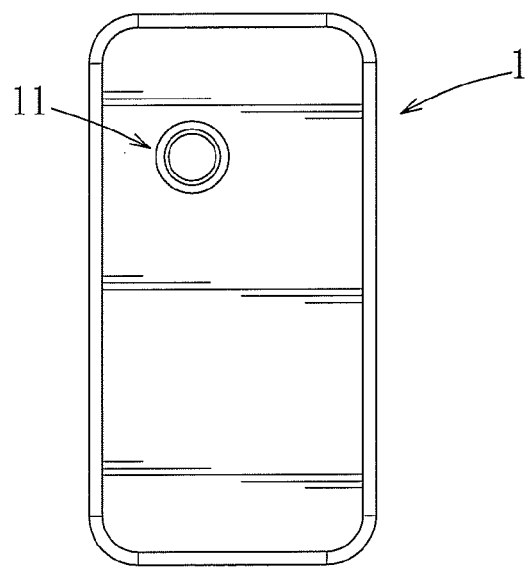
FIG. 1 is a rear view of a conventional cellular phone.
Figure 2:
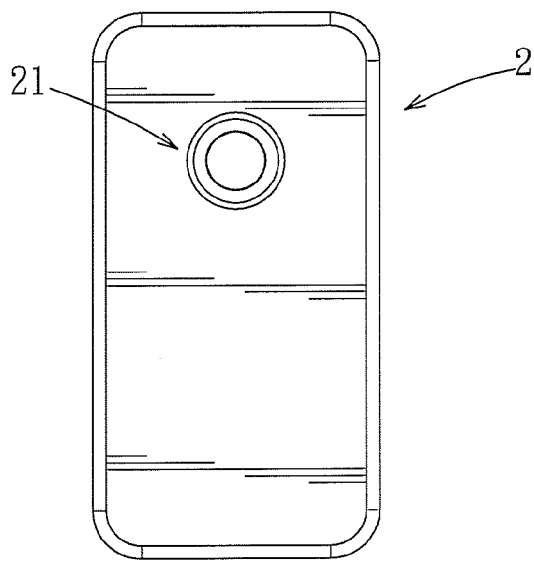
FIG. 2 is a rear view of another conventional cellular phone.

Through a description of the preferred embodiments, the technical means employed by the present invention to achieve the intended object, and the advantageous effects contemplated thereby, can be better understood and appreciated. It is noted that the accompanying drawings are for illustrative purpose and reference only, and are not intended to limit the scope of the present invention.

Before the present invention is described in greater detail, it should be noted that like elements are denoted by the same reference numerals throughout the disclosure.

Figure 3:
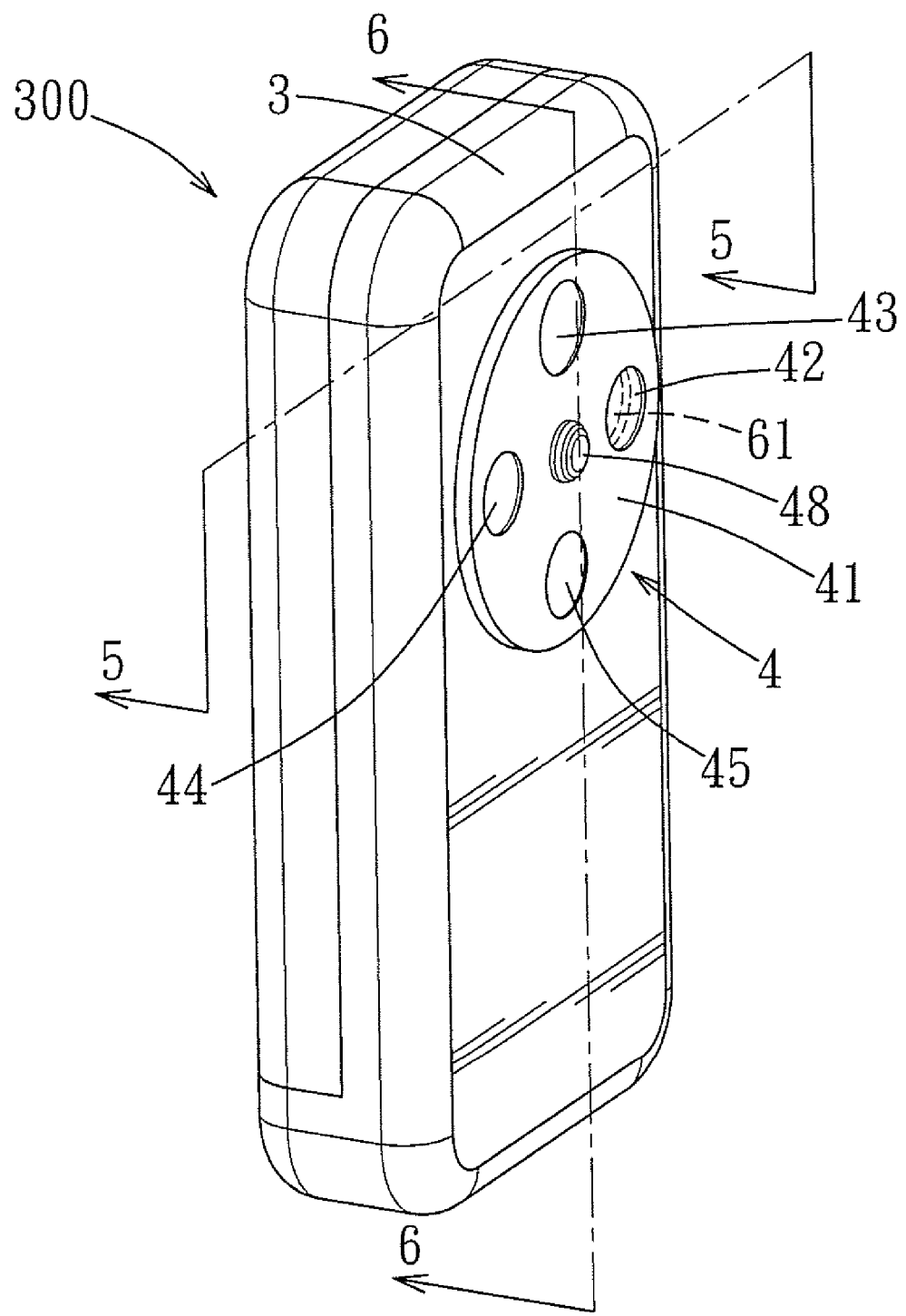
FIG. 3 is a perspective view of a first preferred embodiment of a protective shell for an electronic device according to the present invention.
Figure 4:
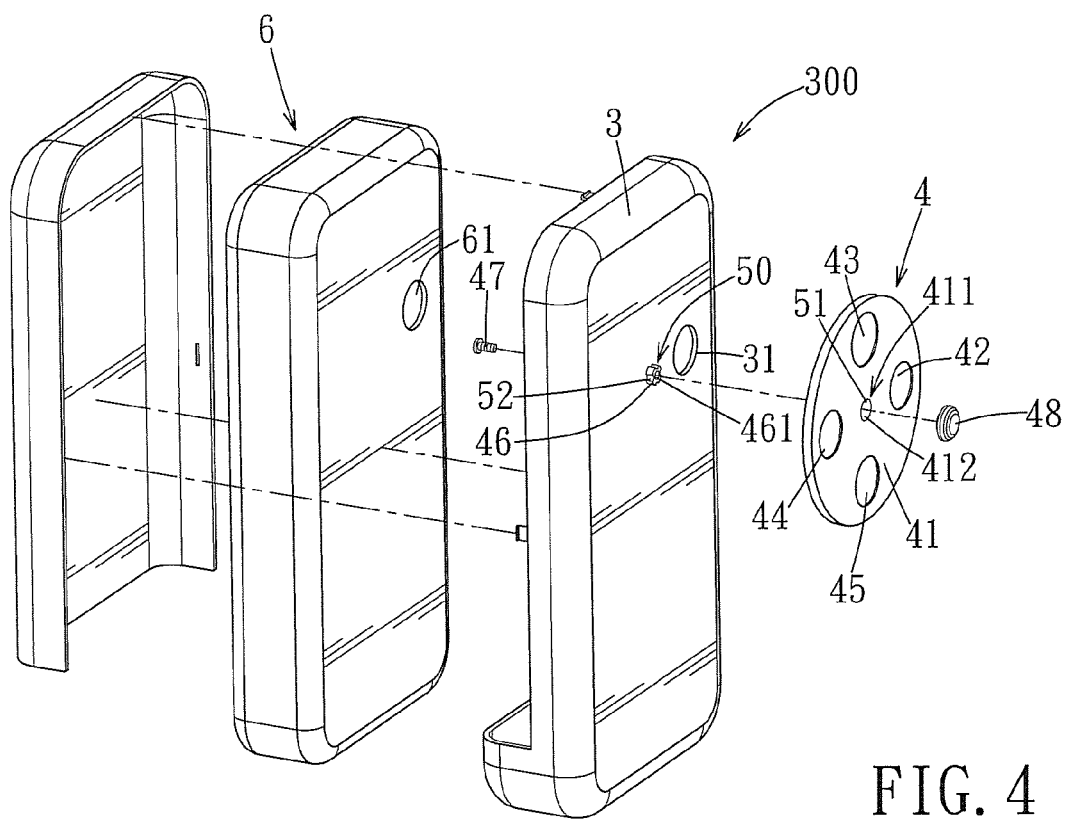
FIG. 4 is an exploded perspective view of the first preferred embodiment.

FIGS. 3 and 4 illustrate the first preferred embodiment of a protective shell 300 for an electronic device 6 according to the present invention. The electronic device 6 in this embodiment is exemplified as a cellular phone, although it may be a personal digital assistant (PDA) or any other portable electronic device. The protective shell 300 is used to accommodate the electronic device 6, and includes a shell body 3 and a lens device 4 mounted on the shell body 3.

Figure 5:
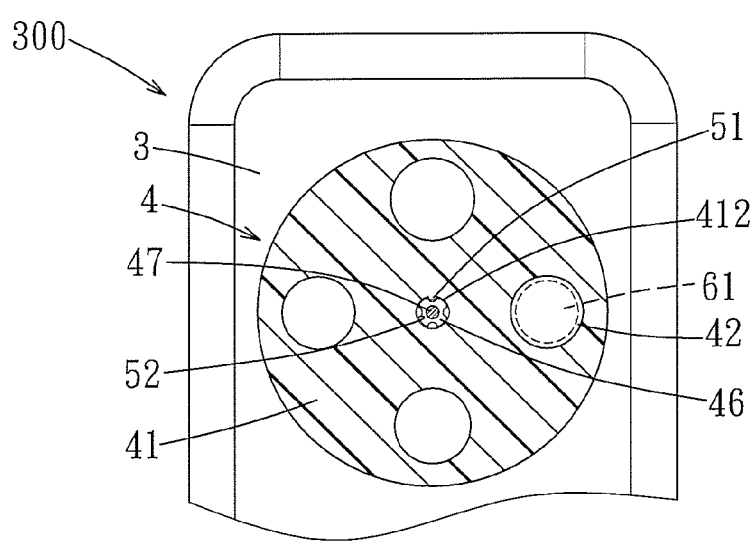
FIG. 5 is a fragmentary sectional view of the preferred embodiment of FIG. 3 taken along line 5-5.
Figure 6:
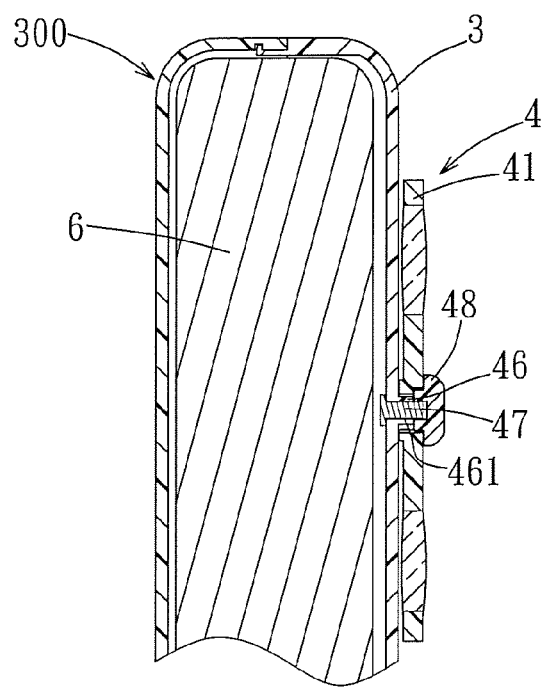
FIG. 6 is a fragmentary sectional view of the preferred embodiment of FIG. 3 taken along line 6-6.

As shown in FIGS. 4, 5, and 6, the electronic device 6 includes a camera lens 61. The shell body 3 is formed from a plastic material, and includes an opening 31 corresponding in position to the camera lens 61. The lens device 4 includes a generally disc-shaped mount member 41, a plurality of lenses 42, 43, 44, and 45 disposed on the mount member 41 and having different functions, a coupling member 46, a screw 47, a locking member 48, and a positioning mechanism 50. Each of the lenses 42, 43, 44, and 45 is set in the mount member 41, but may be adhered to the mount member 41 using glue. Alternatively, the mount member 41 may be formed with the lenses 42, 43, 44 and 45 by injection molding techniques. In this embodiment, the lenses 42, 43, 44 and 45 are, respectively, a convex lens, a filter lens, a wide-angle lens, and a polarized lens. Certainly, the arrangement, number and functions of the lenses 42, 43, 44, and 45 are variable depending on design requirements, and should not be limited to those disclosed in this embodiment.

The coupling member 46 is integrally formed on an outer surface of the shell body 3, and has a through hole 461. The through hole 461 is disposed for extension of the screw 47 therethrough. The mount member 41 has a through hole 411 for extension of the coupling member 46 therethrough, and an inner peripheral surface 412 defining the through hole 411. The positioning mechanism 50 includes a first positioning member 51 formed on the inner peripheral surface 412, and a plurality of second positioning members 52 disposed on the coupling member 46. The first positioning member 51 is a protrusion projecting from the inner peripheral surface 412. The second positioning members 52 are recesses disposed angularly on the outer surface of the coupling member 46. In this embodiment, the second positioning members 52 are four in number and correspond to the lenses 42, 43, 44 and 45 in number.

When it is desired to assemble the mount member 41 of the lens device 4 to the shell body 3, the mount member 41 is mounted on the coupling member 46 such that the coupling member 46 extends into the through hole 411 in the mount member 41. The screw 47 is extended from an inner side of the shell body 3 through the through hole 461 in the coupling member 46 to project from the coupling member 46, and the locking member 48 is threadedly connected to the screw 47 and abuts against an outer surface of the mount member 41, thereby completing assembly of the mount member 41 to the shell body 3.

As shown in FIGS. 3, 5 and 6, when the mount member 41 is rotated such that the mount member 41 is turned relative to the shell body 3 to a position where a selected lens (e.g., the lens 42) correspondingly overlaps the opening 31 in the shell body 3 and the camera lens 61 of the electronic device 6, the first positioning member 51 on the inner peripheral surface 412 of the mount member 41 will engage one of the second positioning members 52 to thereby position the mount member 41 at an angular position defined by said one of the second positioning members 52. Therefore, the mount member 41 will not rotate undesirably relative to the shell body 3 during use of the protective shell 300. At the same time, by utilizing the locking member 48 to abut against the outer surface of the mount member 41, undesired separation between the mount member 41 and the coupling member 46 may be prevented. Since the lens 42 is a convex lens, when the lens 42 is registered with the camera lens 61 and is used in conjunction therewith, the camera lens 61 will have a focusing function. Therefore, clear images of objects at near distances can be captured with the camera lens 61 of the electronic device 6.

When the user desires to switch the mode of use of the lens device 4, the mount member 41 is rotated relative to the shell body 3 such that a selected one of the lenses 43, 44, 45 overlaps the opening 31 and the camera lens 61. In this embodiment, when the lens 43 overlaps the opening 31 and the camera lens 61, the camera lens 61 will have a filtering function. The lens 43 may be a filtering lens, such as a fish-eye lens, a cross lens, a softening lens, or a variable color filter. When the lens 44 overlaps the camera lens 61, the camera lens 61 is provided with a wide-angle function, so that images captured through the camera lens 61 have a wide-angle effect.

When the lens 45 overlaps the camera lens 61, the camera lens 61 will have a light polarization function, which helps deflect light that may affect image quality. With the arrangement of the mount member 41, a selected one of the lenses 42, 43, 44 and 45 can be quickly aligned with the camera lens 61 to permit switching among different modes of use, thereby enabling the camera lens 61 to have close-up, filtering, wide-angle, and polarization functions. Moreover, with one of the lenses 42, 43, 44 and 45 overlapping the camera lens 61, the camera lens 61 can be protected.

Figure 7:
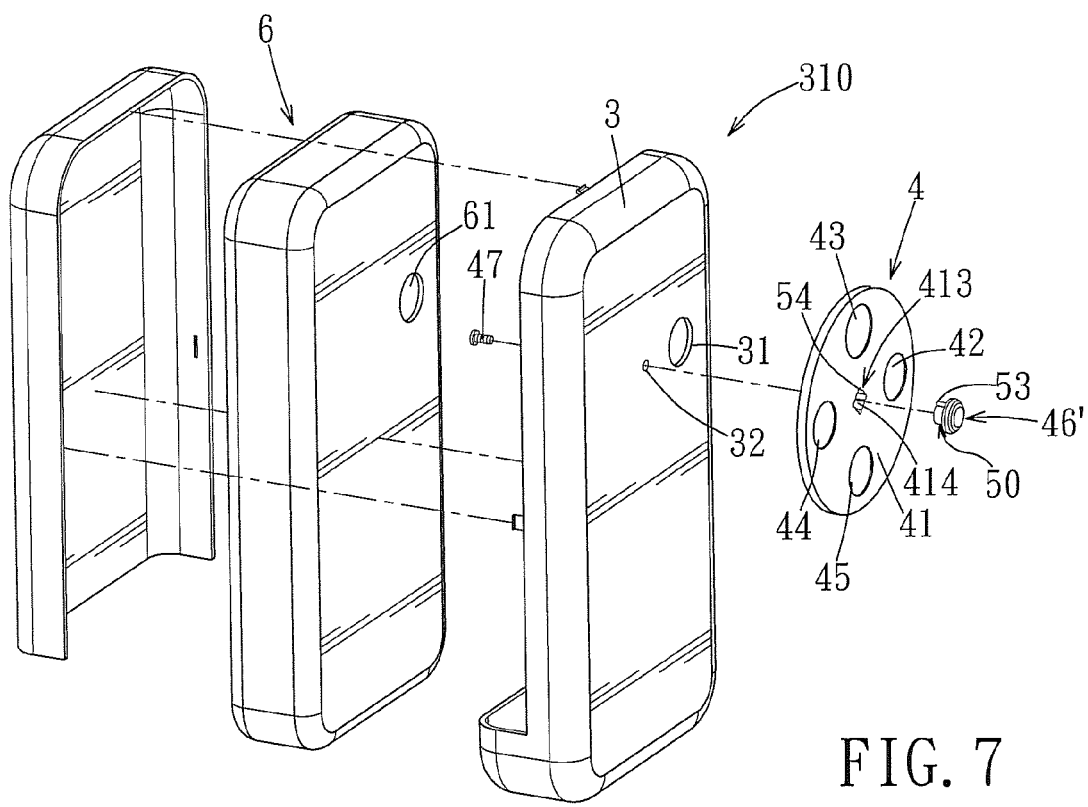
FIG. 7 is an exploded perspective view of a second preferred embodiment of a protective shell for an electronic device according to the present invention.
Figure 8:
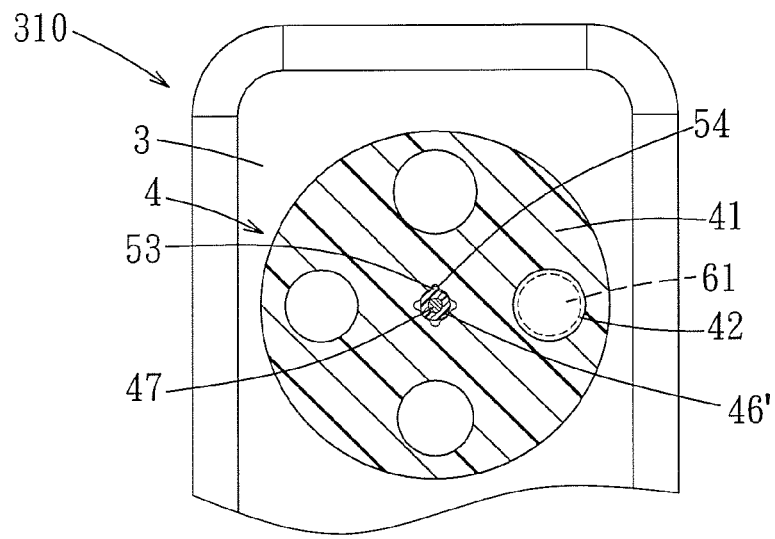
FIG. 8 is a fragmentary sectional view of the second preferred embodiment.

FIGS. 7 and 8 illustrate the second preferred embodiment of a protective shell 310 for an electronic device 6 according to the present invention. The protective shell 310 is substantially similar to that of the first preferred embodiment in structure, and differs therefrom mainly in the positioning of the mount member 41 of the lens device 4 with respect to the shell body 3. In addition, the shell body 3 further includes a hole portion 32 for extension of the screw 47 therethrough. The coupling member 46' extends into the through hole 413 in the mount member 41, and abuts against the outer surface of the mount member 41. The coupling member 46' threadedly engages the screw 47 projecting from the shell body 3. The first positioning member 53 of the positioning mechanism 50 is a protrusion disposed on the coupling member 46. The second positioning members 54 of the positioning mechanism 50 are a plurality of recesses disposed angularly on the inner peripheral surface 414 of the mount member 41 for engaging the protrusion. Rotating the mount member 41 causes the same to rotate relative to the shell body 3. When a selected one of the lenses 42, 43, 44, and 45 overlaps the opening 31 and the camera lens 61, one of the second positioning members 54 will engage the first positioning member 53, so that the mount member 41 can be positioned at an angular position defined by said one of the second positioning members 54.

Figure 9:
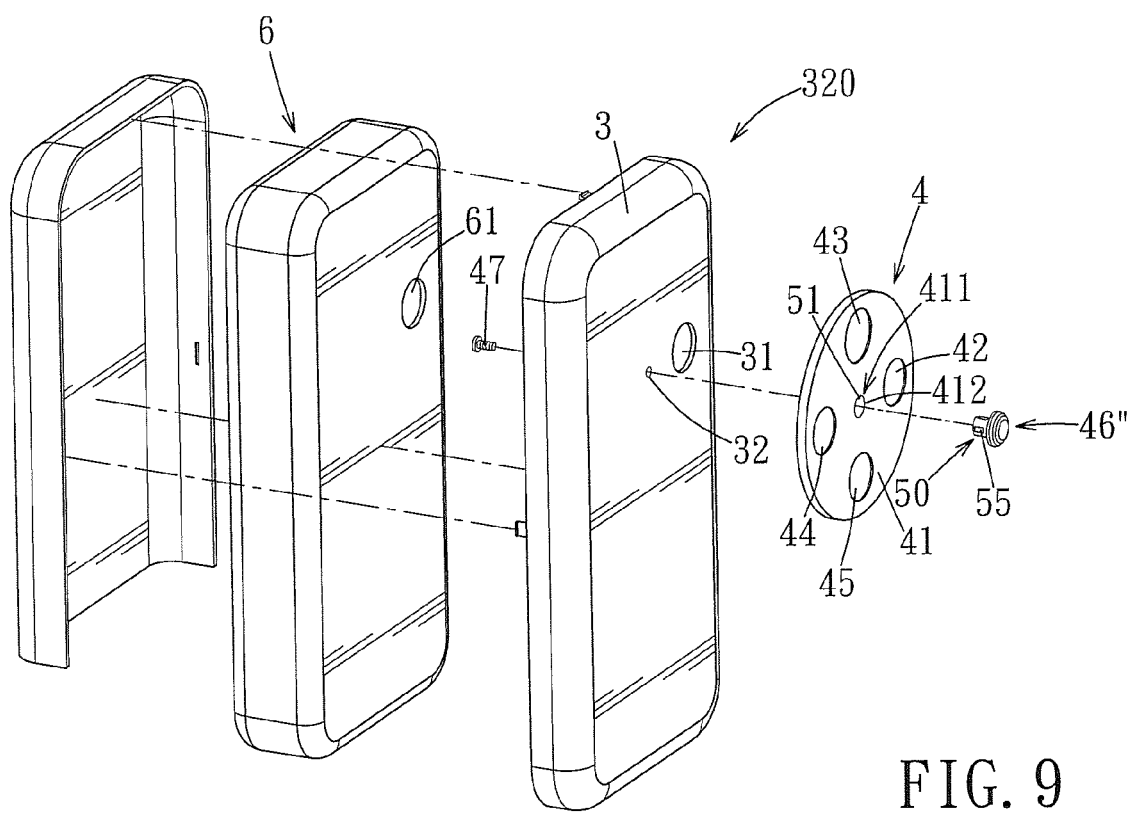
FIG. 9 is an exploded perspective view of a third preferred embodiment of a protective shell for an electronic device according to the present invention.

FIG. 9 shows the third preferred embodiment of a protective shell 320 for an electronic device 6 according to the present invention. The protective shell 320 is substantially similar to that of the second preferred embodiment in structure, and differs therefrom mainly in the positioning of the mount member 41 of the lens device 4 with respect to the shell body 3. The first positioning member 51 of the positioning mechanism 50 is a protrusion projecting from the inner peripheral surface 412. The second positioning members 55 of the positioning mechanism 50 are a plurality of recesses disposed angularly on the outer surface of the coupling member 46" for engaging the protrusion. Rotating the mount member 41 causes the same to rotate relative to the shell body 3. When a selected one of the lenses 42, 43, 44, and 45 overlaps the camera lens 61, the first positioning member 51 on the mount member 41 will engage one of the second positioning members 55, so that the mount member 41 can be positioned at an angular position defined by said one of the second positioning members 55.

Figure 10:
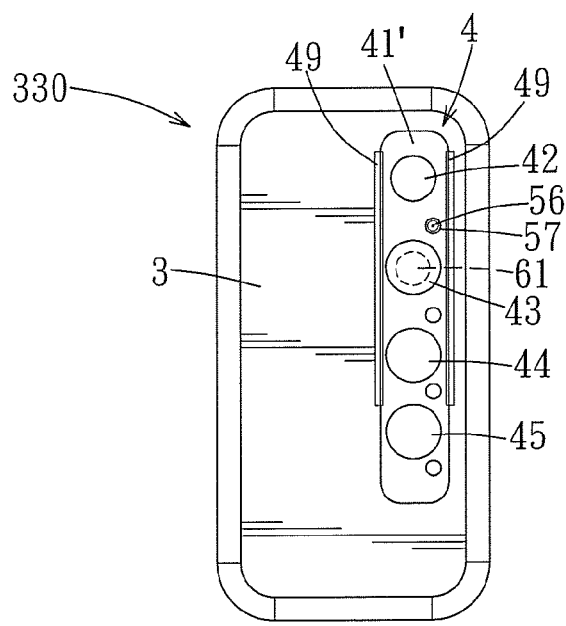
FIG. 10 is a rear view of a fourth preferred embodiment of a protective shell for an electronic device according to the present invention.
Figure 11:
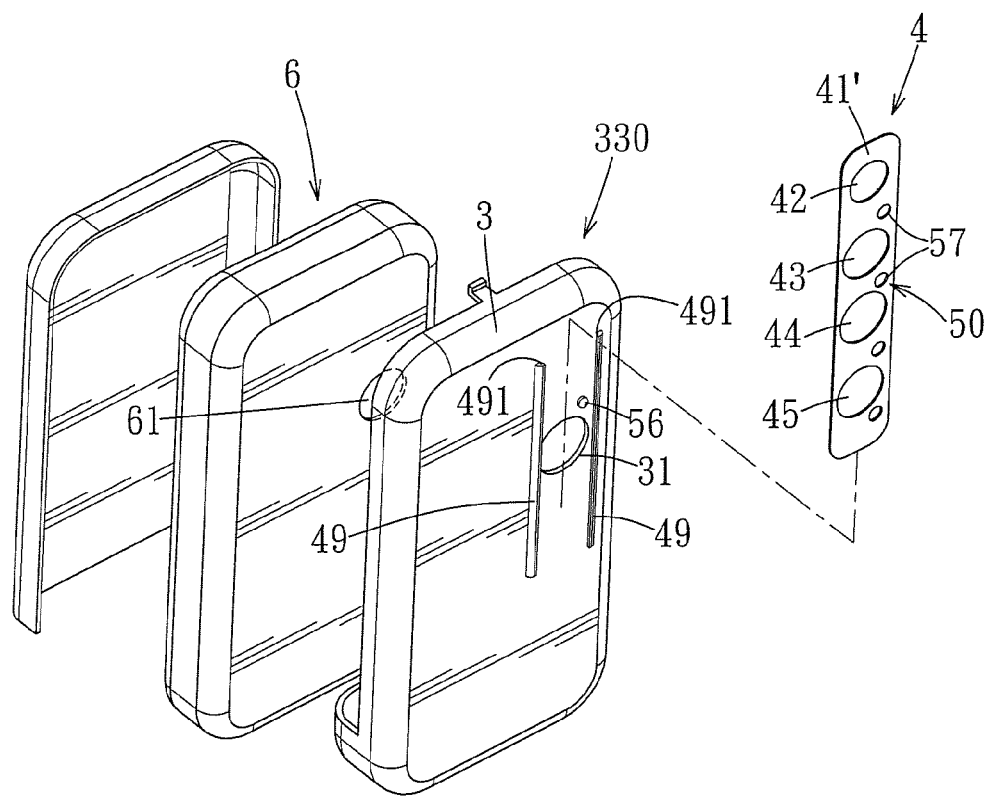
FIG. 11 is an exploded perspective view of the fourth preferred embodiment.

FIGS. 10 and 11 illustrate the fourth preferred embodiment of a protective shell 330 for an electronic device 6 according to the present invention The protective shell 330 differs from that of the first preferred embodiment in that the lens device 4 further includes two guide rails 49 disposed on the shell body 3 in a spaced-apart relationship and on opposite sides of the opening 31. Each of the guide rails 49 has a slide slot 491, and extends longitudinally in a top-to-bottom direction. The mount member 41' of the lens device 4 is in the form of an elongated plate, and is slidably connected to and disposed between the slide slots 491 of the two guide rails 49. The lenses 42, 43, 44, and 45 are set in the mount member 41' in sequence from top to bottom. The first positioning member 56 of the positioning mechanism 50 is a protrusion projecting from the shell body 3 and is located between the two guide rails 49. The second positioning members 57 of the positioning mechanism 50 are a plurality of retaining holes provided in the mount member 41' at spaced intervals for engaging the protrusion. When the user intends to switch the mode of use of the lens device 4, the mount member 41' may be pushed up or down along the guide rails 49. When a selected one of the lenses 42, 43, 44, and 45 overlaps the opening 31 and the camera lens 61, the first positioning member 56 will be retained at a height position defined by the corresponding second positioning member 57.

Figure 12:
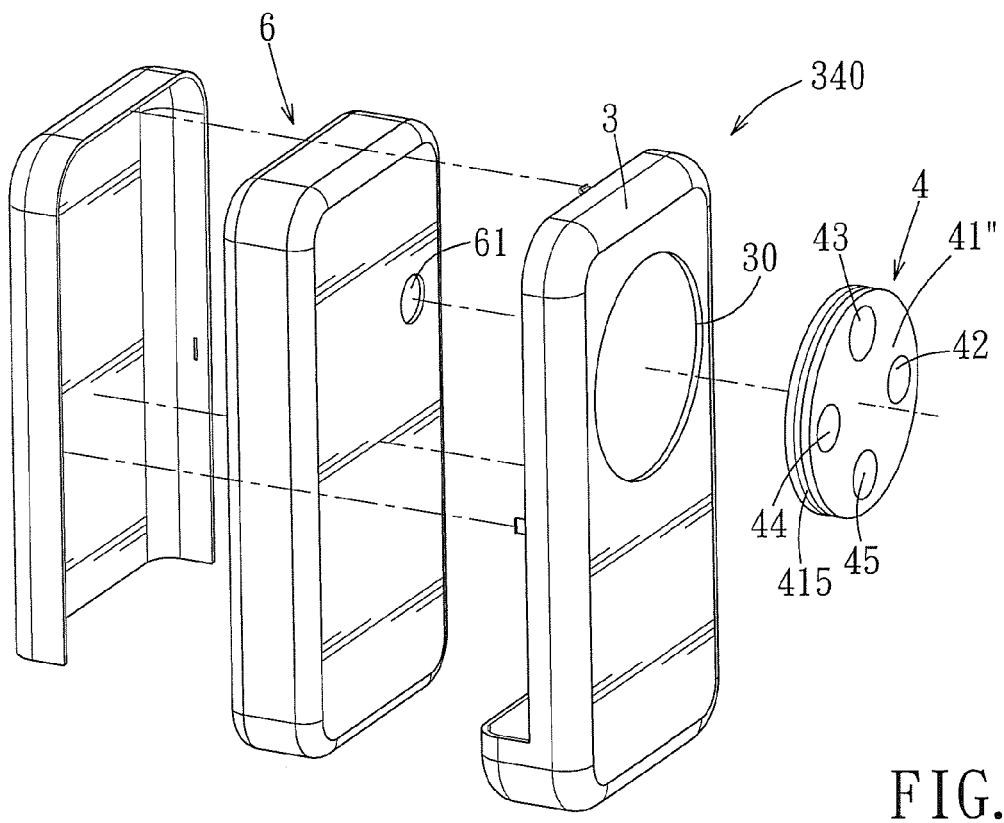
FIG. 12 is an exploded perspective view of a fifth preferred embodiment of a protective shell for an electronic device according to the present invention.
Figure 13:
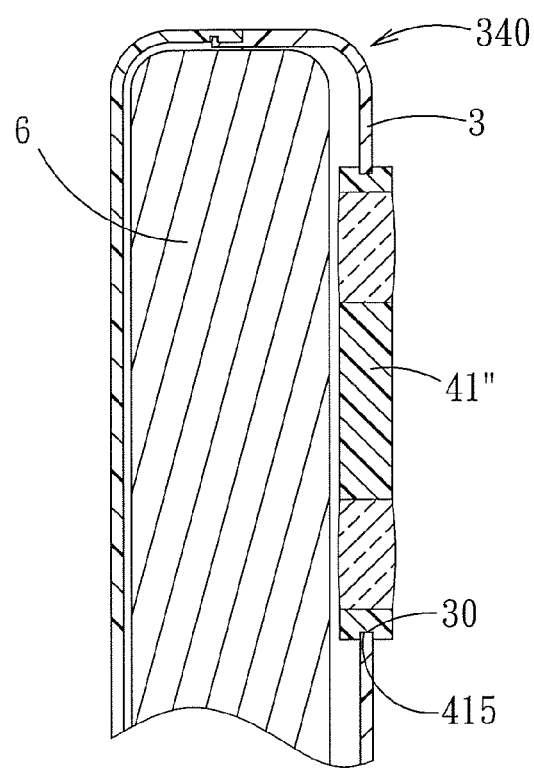
FIG. 13 is a fragmentary sectional view of the fifth preferred embodiment.

FIGS. 12 and 13 illustrate the fifth preferred embodiment of a protective shell 340 for an electronic device 6 according to the present invention. The protective shell 340 differs from that of the first preferred embodiment in that the shell body 3 in this embodiment is formed from a flexible material, and the size of the opening 31' of the shell body 3 corresponds to that of the mount member 41". In addition, the shell body 3 includes an inner peripheral wall 30 defining the opening 31', and the mount member 41" has a groove 415 formed in an outer periphery thereof for engaging the inner peripheral wall 30. Since the shell body 3 is formed from a flexible material, the mount member 41" can be easily retained in the inner peripheral wall 30 and rotated relative to the shell body 3. Thus, a selected one of the lenses 42, 43, 44, and 45 may be brought to overlap the camera lens 61.

In sum, in the above-described embodiments, the mount member 41, 41" of the lens device 4 is rotatable relative to the shell body 3 and the mount member 41' is movable relative to the shell body 3 such that a selected one of the lenses 42, 43, 44, and 45 overlaps the camera lens 61 to permit switching among different modes of use, thereby enabling the camera lens 61 to have different functions, such as close-up, filtering, wide-angle and polarizing functions. At the same time, the lens 42, 43, 44 or 45 overlapping the camera lens 61 can protect the camera lens 61.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements. In addition, it should be appreciated that any of the embodiments of this invention or any of the claims as appended hereto does not necessarily have to achieve all of the objects, advantages or features disclosed herein. Moreover, the title of the invention and the abstract of disclosure are provided herein to allow a searcher to quickly ascertain the subject matter of the technical disclosure of any patent issued on this application, and should not be relied upon to limit the scope of protection sought for this invention.

We claim:

1. A protective shell for an electronic device, the electronic device including a camera lens, said protective shell being adapted to accommodate the electronic device and comprising:
   a shell body adapted to accommodate the electronic device; and
   a lens device mounted on said shell body and including a plurality of lenses, said lens device being operable to move relative to said shell body such that a selected one of said lenses correspondingly overlaps one side of the camera lens of the electronic device;
   a coupling member disposed on said shell body; and, wherein said shell body includes an opening corresponding in position to the camera lens, and said lens device includes a mount member coupled to said shell body, and a positioning mechanism, said lenses being disposed on said mount member and respectively having different functions, said positioning mechanism having a first positioning member disposed on one of said shell body and said mount member, and a plurality of second positioning members disposed on the other one of said shell body and said mount member, said first positioning member engaging one of said second positioning members when said mount member is moved relative to said shell body to a position where the selected one of said lenses overlaps said opening and the camera lens; and, said second positioning members being recesses disposed angularly on said coupling member, said mount member having a through hole for extension of said coupling member therethrough, and an inner peripheral surface defining said through hole, said first positioning member being a protrusion formed on said inner peripheral surface and engageable with said recesses.

2. The protective shell for an electronic device according to claim 1, wherein said coupling member is integrally formed with said shell body and has a through hole, said lens device further including a screw extending through said through hole in said coupling member, and a locking member abutting against said mount member and threadedly engaging said screw.

3. The protective shell for an electronic device according to claim 1, wherein said shell body includes a hole portion, said lens device further including a screw extending through said hole portion, said coupling member abutting against said mount member and threadedly engaging said screw.

4. A protective shell for an electronic device, the electronic device including a camera lens, said protective shell being adapted to accommodate the electronic device and comprising:
  a shell body adapted to accommodate the electronic device; and
  a lens device mounted on said shell body and including a plurality of lenses, said lens device being operable to move relative to said shell body such that a selected one of said lenses correspondingly overlaps one side of the camera lens of the electronic device;
  a coupling member disposed on said shell body; and,
  wherein said shell body includes an opening corresponding in position to the camera lens, and said lens device includes a mount member coupled to said shell body, and a positioning mechanism, said lenses being disposed on said mount member and respectively having different functions, said positioning mechanism having a first positioning member disposed on one of said shell body and said mount member, and a plurality of second positioning members disposed on the other one of said shell body and said mount member, said first positioning member engaging one of said second positioning members when said mount member is moved relative to said shell body to a position where the selected one of said lenses overlaps said opening and the camera lens;
  said lenses are a convex lens, a filter lens, a wide-angle lens, and a polarized lens, respectively; and,
  said second positioning members being recesses disposed angularly on said coupling member, said mount member having a through hole for extension of said coupling member therethrough, and an inner peripheral surface defining said through hole, said first positioning member being a protrusion formed on said inner peripheral surface and engageable with said recesses.

5. The protective shell for an electronic device according to claim 4, wherein said coupling member is integrally formed with said shell body and has a through hole, said lens device further including a screw extending through said through hole in said coupling member, and a locking member abutting against said mount member and threadedly engaging said screw.

6. The protective shell for an electronic device according to claim 4, wherein said shell body includes a hole portion, said lens device further including a screw extending through said hole portion, said coupling member abutting against said mount member and threadedly engaging said screw.

7. A protective shell for an electronic device, the electronic device including a camera lens, said protective shell being adapted to accommodate the electronic device and comprising:
  a shell body adapted to accommodate the electronic device;
  a lens device mounted on said shell body and including a plurality of lenses, said lens device being operable to move relative to said shell body such that a selected one of said lenses correspondingly overlaps one side of the camera lens of the electronic device; and,
  a coupling member disposed on said shell body; and,
  wherein said shell body includes an opening corresponding in position to the camera lens, and said lens device includes a mount member coupled to said shell body, and a positioning mechanism, said lenses being disposed on said mount member and respectively having different functions, said positioning mechanism having a first positioning member disposed on one of said shell body and said mount member, and a plurality of second positioning members disposed on the other one of said shell body and said mount member, said first positioning member engaging one of said second positioning members when said mount member is moved relative to said shell body to a position where the selected one of said lenses overlaps said opening and the camera lens; and,
  said first positioning member being a protrusion disposed on said coupling member, said mount member having a through hole for extension of said coupling member therethrough, and an inner peripheral surface defining said through hole, said second positioning members being recesses disposed angularly on said inner peripheral surface for engaging said protrusion.

8. The protective shell for an electronic device according to claim 7, wherein said shell body includes a hole portion, said lens device further including a screw extending through said hole portion, said coupling member abutting against said mount member and threadedly engaging said screw.

9. A protective shell for an electronic device, the electronic device including a camera lens, said protective shell being adapted to accommodate the electronic device and comprising:
  a shell body adapted to accommodate the electronic device; and,
  a lens device mounted on said shell body and including a plurality of lenses, said lens device being operable to move relative to said shell body such that a selected one of said lenses correspondingly overlaps one side of the camera lens of the electronic device;
  a coupling member disposed on said shell body; and,
  wherein said shell body includes an opening corresponding in position to the camera lens, and said lens device includes a mount member coupled to said shell body, and a positioning mechanism, said lenses being disposed on said mount member and respectively having different functions, said positioning mechanism having a first positioning member disposed on one of said shell body and said mount member, and a plurality of second positioning members disposed on the other one of said shell body and said mount member, said first positioning member engaging one of said second positioning members when said mount member is moved relative to said shell body to a position where the selected one of said lenses overlaps said opening and the camera lens;

said lenses are a convex lens, a filter lens, a wide-angle lens, and a polarized lens, respectively; and, said first positioning member being a protrusion disposed on said coupling member, said mount member having a through hole for extension of said coupling member therethrough, and an inner peripheral surface defining said through hole, said second positioning members being recesses disposed angularly on said inner peripheral surface for engaging said protrusion.

10. The protective shell for an electronic device according to claim 9, wherein said shell body includes a hole portion, said lens device further including a screw extending through said hole portion, said coupling member abutting against said mount member and threadedly engaging said screw.

* * * * *